(12) United States Patent
Reiser et al.

(10) Patent No.: US 9,791,843 B1
(45) Date of Patent: Oct. 17, 2017

(54) RFID INFORMATION USED TO UNLOCK A USER INTERFACE FOR A WIRELESS COMMUNICATION DEVICE

(75) Inventors: Richard Aaron Reiser, Overland Park, KS (US); Christopher Lee Moncrief, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 296 days.

(21) Appl. No.: 13/584,307

(22) Filed: Aug. 13, 2012

(51) Int. Cl.
  *G05B 19/00* (2006.01)
(52) U.S. Cl.
  CPC .................................. *G05B 19/00* (2013.01)
(58) Field of Classification Search
  USPC ....................................................... 340/5.65
  See application file for complete search history.

(56) References Cited

U.S. PATENT DOCUMENTS

| | | | |
|---|---|---|---|
| 7,471,199 B2 | 12/2008 | Zimmerman et al. | |
| 2003/0030542 A1* | 2/2003 | von Hoffmann | G06F 21/35 340/5.61 |
| 2006/0237427 A1* | 10/2006 | Logan | E05B 47/0002 219/401 |
| 2007/0204329 A1 | 8/2007 | Peckover | |
| 2010/0022217 A1 | 1/2010 | Ketari | |

* cited by examiner

*Primary Examiner* — Joseph Feild
*Assistant Examiner* — John Mortell

(57) ABSTRACT

Embodiments disclosed herein provide systems and methods for unlocking a wireless communication device into an operating mode based on RFID element information. In a particular embodiment, a method provides locking a user interface on the wireless communication device. The method further provides receiving a wireless signal from a first Radio Frequency Identification (RFID) element and responsively determining if the wireless signal comprises a valid unlock instruction. If the first signal comprises the valid unlock instruction, then the method provides selecting one of the operating modes for the wireless communication device, unlocking the user interface on the wireless communication device, and operating the wireless communication device in the selected operating mode.

20 Claims, 5 Drawing Sheets

| OPERATING MODE TABLE 600 | |
|---|---|
| RFID | OPERATING MODE |
| 321 | HOME |
| 322 | CAR |
| 323 | WORK 1 |
| 324 | WORK 2 |
| ... | ... |

FIGURE 6

RFID INFORMATION USED TO UNLOCK A USER INTERFACE FOR A WIRELESS COMMUNICATION DEVICE

TECHNICAL BACKGROUND

Radio-frequency identification (RFID) elements, such as RFID tags, have been used to provide information to reader devices without requiring line of sight, as is needed with barcodes. These RFID elements may be active in that they may transfer a signal from a powered transmitter or passive in that they may be powered by the radio energy from a reader device configured to read RFID elements. Passive elements, in particular, are very simple, inexpensive, do not take up very much space, and can therefore be placed almost anywhere.

Many modern communication devices, such as smartphones, include RFID readers to harness the advantages of RFID. These devices are able to therefore read information off of the RFID elements and process the information accordingly. In a particular example, a restaurant may place an RFID tag on its window or in an advertisement. A user can direct his or her smartphone to read the information off of the RFID tag and that information directs the smartphone to open a webpage with the menu of the restaurant.

OVERVIEW

Embodiments disclosed herein provide systems and methods for unlocking a wireless communication device into an operating mode based on RFID element information. In a particular embodiment, a method provides locking a user interface on the wireless communication device. The method further provides receiving a wireless signal from a first Radio Frequency Identification (RFID) element and responsively determining if the wireless signal comprises a valid unlock instruction. If the first signal comprises the valid unlock instruction, then the method provides selecting one of the operating modes for the wireless communication device, unlocking the user interface on the wireless communication device, and operating the wireless communication device in the selected operating mode.

BRIEF DESCRIPTION OF THE DRAWINGS

FIG. 6 illustrates a data structure used for unlocking a wireless communication device into an operating mode based on RFID element information.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
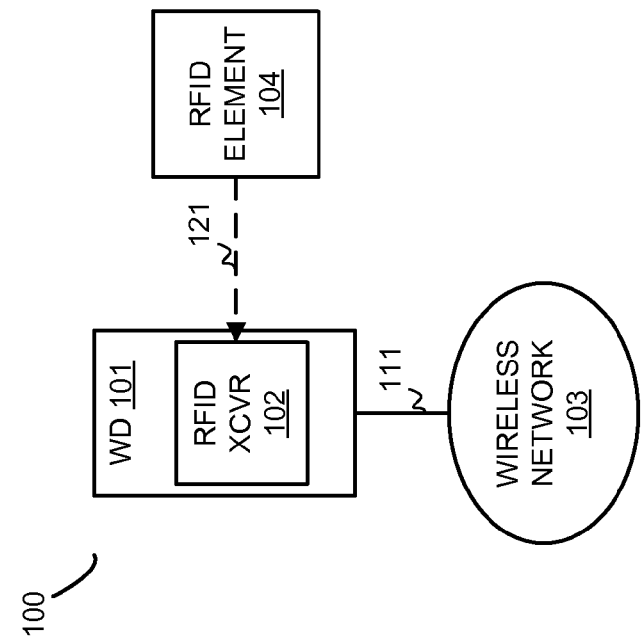
FIG. 1 illustrates a wireless communication system for unlocking a wireless communication device into an operating mode based on RFID element information.

FIG. 1 illustrates wireless communication system 100. Wireless communication system 100 includes wireless communication device 101, radio-frequency identification (RFID) transceiver 102, wireless communication network 103, and RFID element 104. Wireless communication device 101 and wireless communication network 103 communicate over wireless link 111.

In operation, RFID element 104 contains information that can be read wirelessly by RFID transceiver 102 into wireless device 101. Traditionally, RFID element 104 would be used for identifying information about an object to which RFID 104 is attached. For example, RFID element 104 may identify a package to which RFID element 104 is attached and RFID transceiver 102 is able to read the package identification information from RFID element 104 into wireless device 101. While RFID element 104 may still be used for identification of objects, wireless device 101 is capable of using the information stored thereon for purposes beyond simple object identification.

RFID element 104 may take the form of a tag or label attached to objects or may be otherwise built into an object in a manner that allows RFID transceiver 102 to read information stored thereon.

Figure 2:
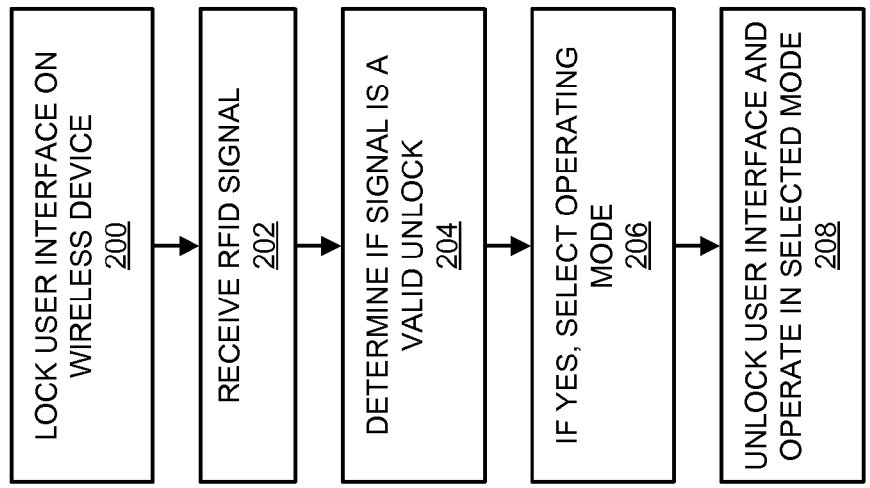
FIG. 2 illustrates the operation of the wireless communication system for unlocking a wireless communication device into an operating mode based on RFID element information.

FIG. 2 illustrates the operation of wireless communication system 100 for unlocking a wireless device into an operating mode based on RFID element information. The operation begins with the locking of a user interface on wireless communication device 101 (step 200). A user interface may be considered locked when the user interface does not allow full user interaction functionality until the user interface is unlocked. For example, a locked user interface may not react to button presses or touch screen interactions aside from those interactions intended to unlock the device, such as a sequence of button presses or a touchscreen gesture designed to unlock the device. In some cases, wireless device 101 may be in a standby mode when locked. A standby mode may include disabling a display, putting a processing system into a low power state, putting communication interfaces of into a low power state, or any other power conservation measure in wireless device 101. The user interface may be locked by a button press by a user, a touchscreen interaction, an elapsing of time, or any other way that a user interface may become locked.

Wireless signal 121 is received from RFID element 104 (step 202). Wireless signal 121 is received by RFID transceiver 102 when wireless device 101 is placed near enough to RFID element 104 to be within the wireless signal range of RFID element 104. The wireless signal range of RFID element 104 may depend on whether RFID element is passive or active. An active RFID element 104 may be a powered element, such as battery powered, and may use the power to transmit a wireless signal. In contrast, a passive RFID element 104 has no power source and is instead powered by the radio energy transmitted by RFID transceiver 102 when attempting to read RFID element 104. Typically, RFID transceiver 102 will need to be very close to a passive RFID element 104, possibly within an inch or two, in order for RFID transceiver 102 to power RFID element 104.

RFID element 104 may be any type of element that can store and transmit RFID information. For example, RFID element 104 may be an RFID tag that can be placed on or in any object that will be associated with that RFID tag. Alternatively, RFID element 104 may be preinstalled or integrating into an object.

Wireless signal 121 transports the information stored on RFID element 104. This information may be any type of digital information. Thus, the information includes a number of bits that are arranged in a sequence that may represent letters, numbers, symbols, instructions, or any other type of data including header type information.

RFID transceiver 102 may only be capable of reading passive RFID elements, active RFID elements, or may be capable of reading both. Additionally, RFID transceiver 102 may be capable of writing to RFID elements as well as participating in other types of near field communications (NFC) exchanges, such as device-to-device data transfer.

After receiving wireless signal 121, wireless device 101 responsively determines if wireless signal 121 comprises a valid unlock instruction (step 204). Wireless device 101 may determine whether wireless signal 121 comprises a valid unlock instruction in various ways. In one example, wireless device 101 compares at least a portion of the information contained in wireless signal 121 to information in a data structure. If the information from wireless signal 121 matches any of the information in the data structure that indicates a valid unlock instruction, then wireless device 101 determines that wireless signal 121 does include a valid unlock instruction. Alternatively, the information in wireless signal 121 may itself be an instruction, such as an application programming interface (API) call, to the operating system of wireless device 101 to unlock the user interface. In some examples, the information in wireless signal 121 is encoded so that only wireless device 101, or some other device with the decoding capabilities of wireless device 101, can read the information.

In some embodiments, wireless device 101 may communicate with wireless network 103 to determine if wireless signal 121 comprises a valid unlock instruction. For example, wireless device 101 may transfer at least a portion of the information in wireless signal 121 to a system on wireless network 103 and the system will return an indication of whether the transferred information included a valid unlock instruction.

If wireless device 101 determines that wireless signal 121 comprises the valid unlock instruction, then one of the operating modes for the wireless communication device is selected (step 206), the user interface on wireless device 101 is unlocked, and wireless device 101 is operated in the selected operating mode (step 208).

The operating mode may be selected based on the unlock instruction itself, based on information in wireless signal 121 other than the unlock instruction, or based on any other sources and factors, such as time of day or device location—including combinations thereof. For example, wireless device 101 may determine that a particular operating mode corresponds to the unlock instruction by referencing a data structure stored on wireless device 101 or accessed over wireless network 103.

Alternatively, other information in wireless signal 121 may indicate the operating mode associated with RFID element 104. For example, one part of the information may include an unlock code while another includes an operating mode indication. As with the unlock instruction in step 204, wireless device 101 may reference a data structure that indicates operating modes that correspond to RFID information, the information itself may be an instruction, such as an API call, that instructs wireless device 101 into a particular operating mode, or some other method for determining an operating mode.

The operating mode may customize any part of the operating parameters of wireless device 101 that can be managed by software instructions. The operating mode may indicate which wireless radios should be enabled, which of other hardware elements, such as a camera, should be enabled, which applications on wireless device 101 can execute, ringer settings, limitations to how applications execute, such as preventing or only allowing voice calls, limitations on data usage, instructions for applications to execute in a certain way, such as to call, text, or email a particular person, modifications to the appearance of a user interface display, such as application icon arrangement and background wallpaper, or modify any other type of operating parameter in wireless device 101.

Furthermore, the selected operating mode is one of multiple operating modes that may exist for wireless device 101 and may be indicated by information in wireless signal 121. Each operating mode may have at least one parameter that differs from other modes and/or a default operating mode. The operating modes may be defined by a user, come preinstalled on wireless device 101, defined by someone other than a user, such as downloaded from a website, or by any other means of defining operating parameters for wireless device 101.

In some embodiments, unlocking the user interface of wireless device 101 may return wireless device 101 a usable state, including activating the display, buttons, sensors, or other elements of wireless device 101 so that a user can operate wireless device 101 in the selected operating mode. Alternatively, the user interface may simply be unlocked though not yet fully usable. In other words, a user may still need to perform an action to return the user interface to a usable state. For example, after unlocking wireless device 101 in step 208, a user may still need to indicate that the user wants to operate wireless device 101. A common method of indication on modern touchscreen devices is to slide an on-screen indicator but other methods may be used. This indication may need to be performed by the user within a period of time after unlocking wireless device 101 before wireless device 101 relocks the user interface. Similarly, wireless device 101 may require a further step by a user to unlock the user interface, such as entering a passcode, pattern, fingerprint, or some other security measure. In some examples, the security measure may only be required after a threshold number of unlocks is reached or after a period of time has elapsed since the user interface was last locked.

In further embodiments, locking wireless device 101 may be performed in response to information received from RFID element 104 or some other RFID element. For example, after reading information from RFID element 104, wireless device 101 may determine that wireless device 101 is not locked and lock the user interface in response to the determination. Alternatively, a separate RFID element may be read in a manner similar to that described above for RFID element 104 and the separate RFID element includes instructions to lock wireless device 101.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless communication device 101 further includes RFID transceiver 102. RFID transceiver 102 comprises Radio Frequency (RF) communication circuitry and an antenna capable of receiving wireless signals from RFID elements. RFID transceiver 102 further includes an interface to communicate with processing circuitry of wireless device 101. While discussed as a separate element of wireless device 101, RFID transceiver 102 may be integrated into other elements of wireless device 101.

RFID element 104 comprises Radio Frequency (RF) communication circuitry and an antenna capable of transmitting wireless signals to RFID receivers. RFID element 104 further includes circuitry for storing information that may be transmitted to RFID receivers. If RFID element 104 is an active RFID element, then RFID element 104 further includes a power source, such as a battery, to power RFID element 104. In some embodiments the circuitry and antenna of RFID element may be further configured to receive and store information from an RFID transceiver for transmittal at a later time.

Wireless communication network 103 comprises network elements that provide communications services to wireless device 101. Communication network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format.

Figure 3:
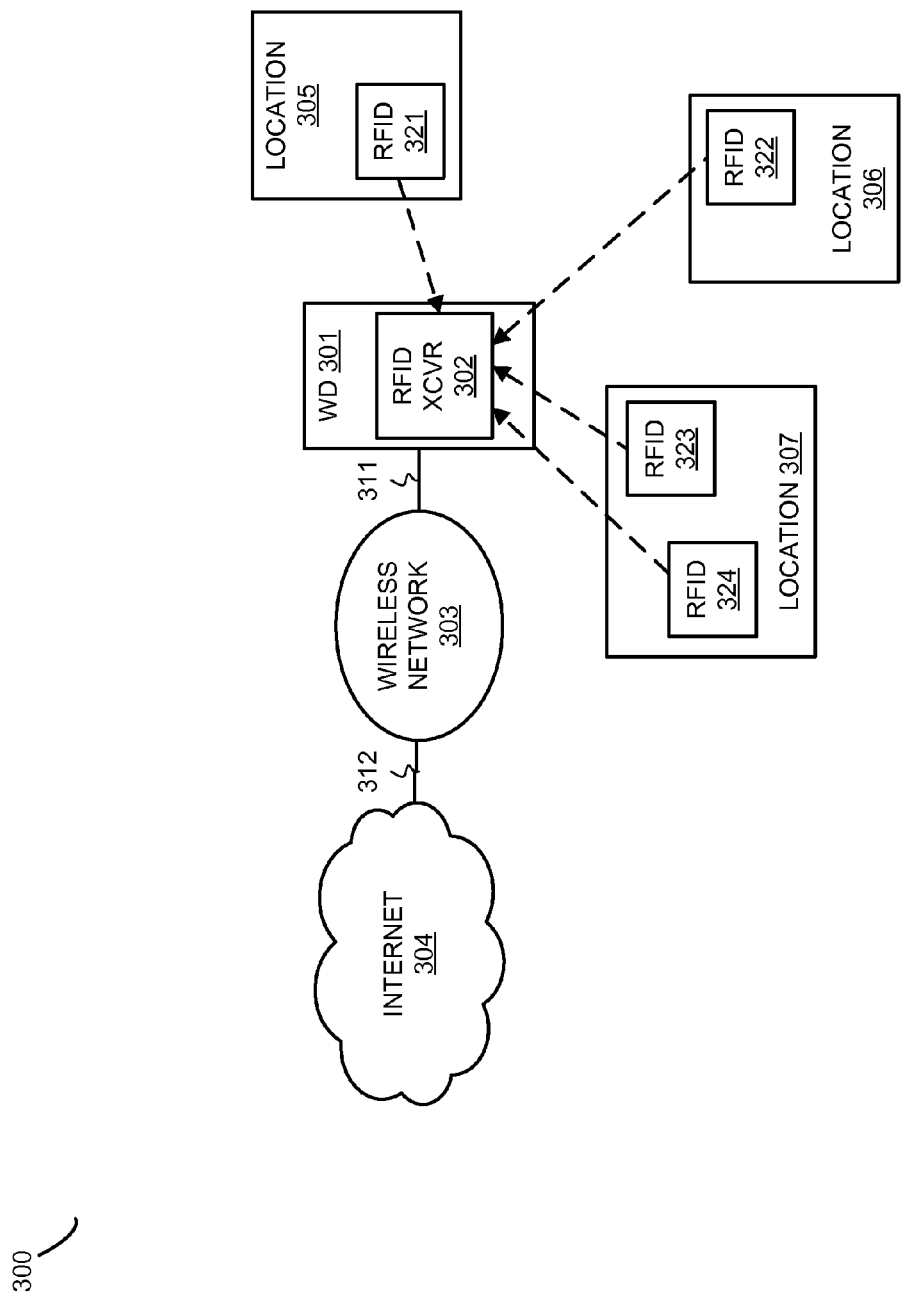
FIG. 3 illustrates a wireless communication system for unlocking a wireless communication device into an operating mode based on RFID element information.

FIG. 3 illustrates wireless communication system 300. Wireless communication system 300 includes wireless communication device 301, radio-frequency identification (RFID) transceiver 302, wireless access network 303, Internet 304, locations 305-307, and RFID elements 321-324. Wireless communication device 301 and wireless access network 303 communicate over wireless link 311. Wireless access network 303 and wireless communication device 301 communicate over communication link 312.

Communication link 312 uses metal, glass, air, space, or some other material as the transport media. Communication link 312 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 312 could be a direct link or may include intermediate networks, systems, or devices.

In operation, each location of locations 305-307 may be any type of location where RFID elements 321-324 may be placed. For example, the locations may be objects on or in which each RFID element is placed or may be locations where those objects are located, such as a room, vehicle, or other type of area. Each RFID element may correspond to a different operating mode but also multiple RFID elements may correspond to a single operating mode. Accordingly, each RFID element may indicate an operating mode that is appropriate for the location where each element is located.

Figure 4:
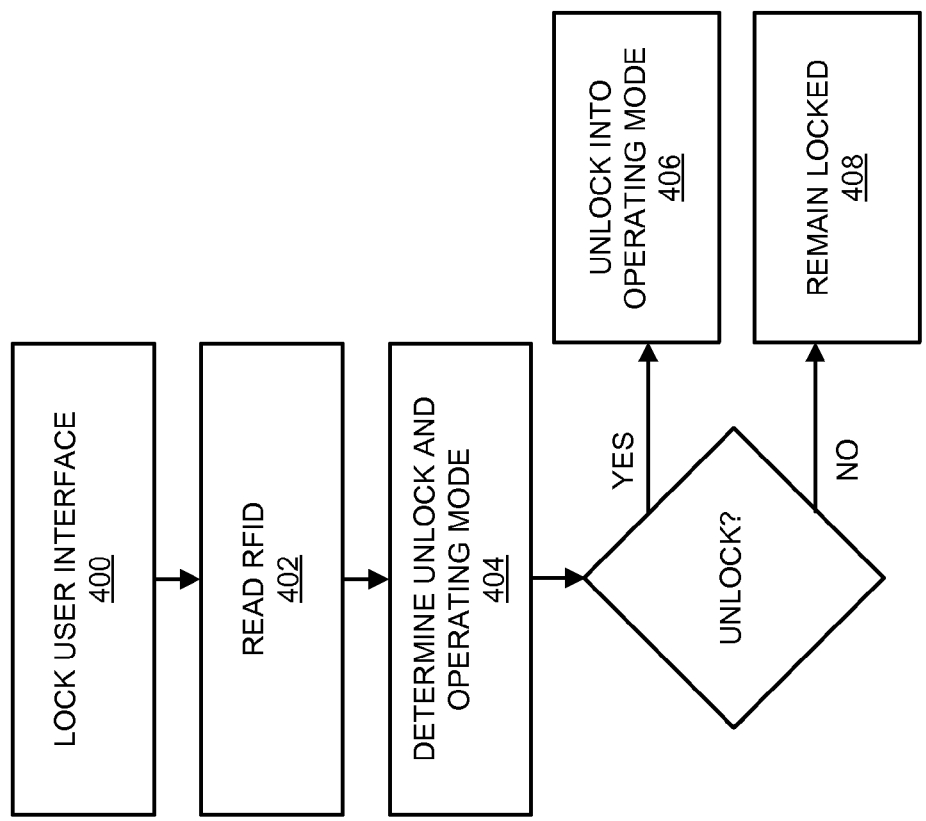
FIG. 4 illustrates the operation of the wireless communication system for unlocking a wireless communication device into an operating mode based on RFID element information.

FIG. 4 illustrates the operation of wireless communication system 300 for unlocking a wireless device into an operating mode based on RFID element information. In this embodiment, wireless device 301 is a cellular smartphone of a user. The user has placed each of RFID elements 321-324 in locations corresponding to operating modes identified by each of the RFID elements. Location 305 is a location in the user's home. Thus, RFID element 321 is placed in a location in the users home, such as on the refrigerator, next to an entry door, a coffee table, or anywhere else within the home. Location 306 is in the user's car and RFID element 322 is placed in a location in the user's car, such as the center console, sun visor, instrument panel, or anywhere else in the car. Location 307 is at the users office and RFID elements 323 and 324 are placed at locations in the user's office. In a particular example, element 323 may be placed at the user's desk while element 324 may be placed in a conference room of the user's office.

When the user is finished using wireless device 301 during a session, such as placing a call, sending an email, searching the web, or using some other application(s), the user locks the user interface of wireless device 301 (step 400). During the session before locking wireless device 301, wireless device 301 may be operating in any operating mode of the operating modes for wireless device 301.

At some time after the user interface is locked, the user directs wireless device 301 to read an RFID element of RFID elements 321-324 depending on where the user is located at the time (step 402). RFID transceiver 302 may automatically read the RFID element when the user places wireless device 301 within a wireless signal range of the RFID element. Alternatively, the user may need to indicate that RFID transceiver 302 should read the RFID element. For example, the user may press a button on wireless device 301 indicating that wireless device 301 should read the RFID element. Similarly, the user may tap the RFID element with wireless device 301, an accelerometer signal in wireless device 301 indicates that the tap occurred, and the RFID transceiver 302 reads the RFID element. Any other method for indicating that RFID transceiver 302 should read the RFID element may also be used.

After wirelessly reading the information off of the RFID element, wireless device 301 determines whether the information instructs wireless device 101 to unlock wireless device 301 and, if so, what operating mode wireless device 301 should unlock into (step 404). In this embodiment, wireless device 301 references operating mode table 600, illustrated in FIG. 6, to perform the determinations of step 402. Table 600 includes two columns and may be stored on wireless device 301 or remotely over wireless network 303 or Internet 304. A first column lists the information included in each of RFID tags 321-324 along with any other RFID tags that are allowed to unlock the user interface of wireless device 301. The information is listed as the RFID element number of FIG. 3 but may be any sort of information, including a sequence of bits, letters, numbers, words, symbols, or any other type of information. A second column of table 600 lists the operating mode that corresponds to the RFID information in the first column. In some embodiments, table 600 may define the parameters of each operating mode instead of or in addition too listing the operating mode corresponding to each RFID element.

Accordingly, if the information from the RFID tag read in step 402 is listed in table 600, then the information allows wireless device 301 to be unlocked and the operating mode is the operating mode listed in table 600 next to the information (step 406). Conversely, if the information is not listed in table 600, then wireless device 301 should remain locked (step 408).

In this example, if wireless device 301 reads RFID element 321, then wireless device 301 unlocks into home operating mode according to table 600. The parameters of home operating mode may include a loud ringer volume, allow the use of apps that the user may not want access to outside of the home, turn on a WIFI radio for wireless device 301 to access the home WIFI network, or any other parameters for wireless device 301.

Similarly, if wireless device 301 reads RFID element 322, then wireless device unlocks into a car operating mode. Car operating mode may include parameters that limit the usage of wireless device 301 to encourage safe driving, such as only allowing voice calls over a wireless headset. If wireless device 301 reads RFID element 323, then wireless device 301 unlocks into a first work operating mode. The first work operating mode may include parameters that turn off personal email accounts and organizes the display with information and applications useful at the office. If wireless device 301 reads RFID element 323, then wireless device 301 unlocks into a second work operating mode. As stated above RFID element 324 is located a conference room. Thus, the second work operating mode may include parameters that silence wireless device 301 so as not to interrupt a meeting.

In some embodiments, the user of wireless device 301 may carry around another RFID element to ensure that the user can unlock wireless device 301 wherever the user happens to be. The RFID element may be, for example, located in the user's wallet, or part of some other personal item, such as a piece of jewelry, so that the user need only to tap wireless device 301 to his or her wallet in order to unlock wireless device 301. The RFID element, like any other RFID element described herein, may correspond to its own operating mode or may indicate that wireless device 301 should unlock into whatever operating mode wireless device 301 was previously operating in before being locked.

Figure 5:
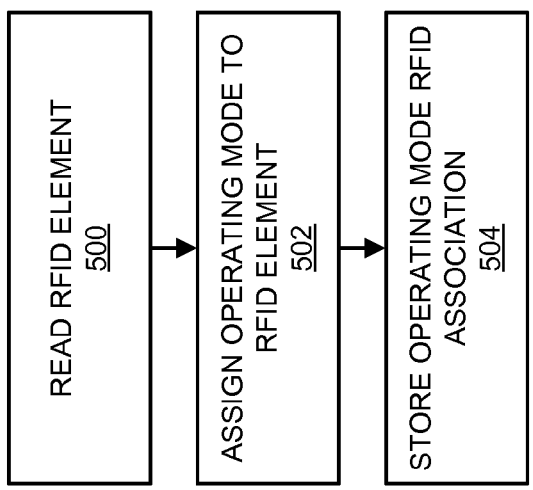
FIG. 5 illustrates the operation of the wireless communication system for unlocking a wireless communication device into an operating mode based on RFID element information.

FIG. 5 illustrates the operation of wireless communication system 300 to populate table 600 for unlocking a wireless device into an operating mode based on RFID element information. In this embodiment, RFID elements 321-324 each contain information comprising a unique code, such as a bit string, and may also include any header information necessary for a reader to process the code. As with the discussion of FIG. 4, this code is represented as the RFID element's number for clarity in table 600. RFID elements 321-324 may be placed in locations 305-307 before or after performing the process described below.

The user of wireless device 301 directs wireless device 301 to read the code from each RFID element (step 500). RFID transceiver 302 may automatically read the RFID element when the user places wireless device 301 within a wireless signal range of the RFID element. Alternatively, the user may need to indicate that RFID transceiver 302 should read the RFID element. For example, the user may press a button on wireless device 301 indicating that wireless device 301 should read the RFID element. Similarly, the user may tap the RFID element with wireless device 301, an accelerometer signal in wireless device 301 indicates that the tap occurred, and the RFID transceiver 302 reads the RFID element. Any other method for indicating that RFID transceiver 302 should read the RFID element may also be used.

An operating mode is then assigned to the code for the RFID element (step 502). The user of wireless device 301 may perform selections on the user interface of wireless device 301 to assign the operating mode. For example, the user may run an RFID application in wireless device 301, direct the application to read the RFID element, and then select an operating mode that should correspond to that RFID element. The parameters of each operating mode may be predefined by the user, predefined by some other source, such as the manufacturer of wireless device 301, defined by the user at the time of assignment to an RFID element, or by any other method.

After assigning an operating mode to the RFID element, the operating mode and corresponding RFID element code are stored in table 600 (step 504). After storing in table 600, the associations can be used for the method of FIG. 4. Therefore, in accordance with the above method, the user instructs wireless device 301 to read RFID element 321 and assigns the home operating mode to RFID element 321, which is then stored in table 600. The user similarly assigns car, work 1, and work 2 operating modes to RFID elements 322-324, respectively.

In some embodiments, the user may change the operating mode assignments or redefine operating mode parameters for a particular RFID element in a manner similar to that described in FIG. 5.

Figure 7:
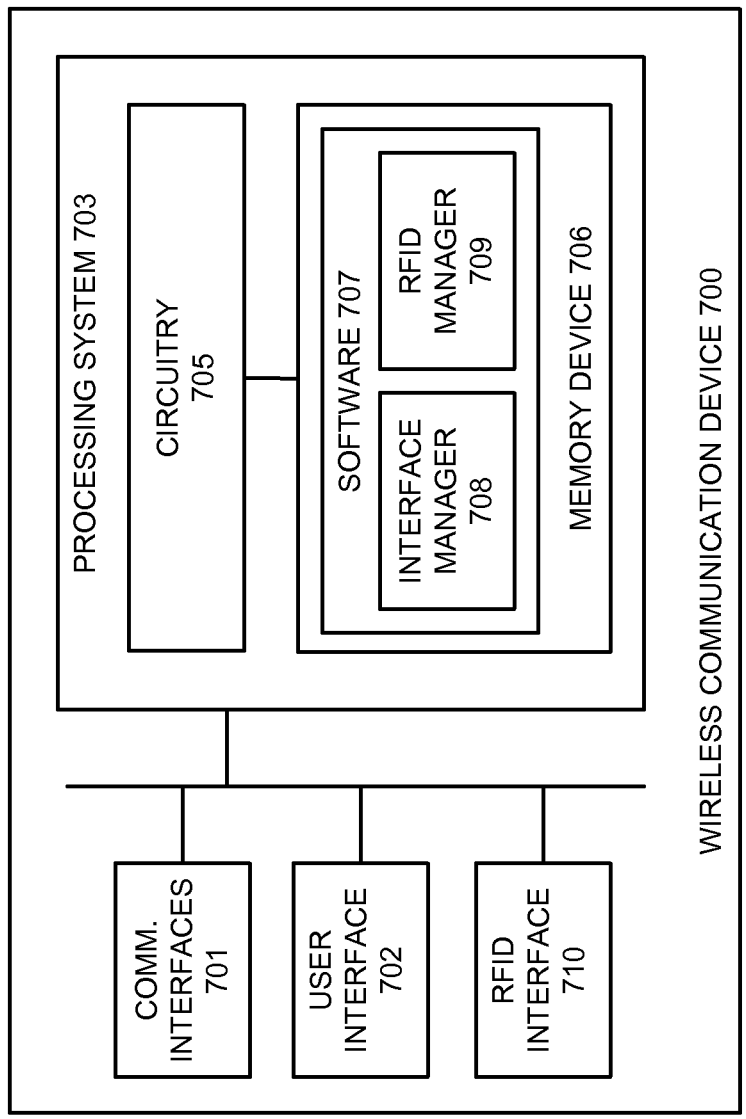
FIG. 7 illustrates a wireless communication device for unlocking a wireless communication device into an operating mode based on RFID element information.

FIG. 7 illustrates wireless communication device 700. Wireless communication device 700 is an example of wireless communication devices 101 and 301, although devices 101 and 301 could use alternative configurations. Wireless communication device 700 comprises wireless communication interface 701, user interface 702, RFID interface 710, and processing system 703. Processing system 703 is linked to wireless communication interface 701, RFID interface 710, and user interface 702. Processing system 703 includes processing circuitry 705 and memory device 706 that stores operating software 707. Wireless communication device 700 may include other well-known components such as a battery and enclosure that are not shown for clarity. Wireless communication device 700 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

RFID interface 710 comprises Radio Frequency (RF) communication circuitry and an antenna capable of receiving wireless signals from RFID elements. RFID interface 710 may further be capable of transmitting signals to RFID elements or between other devices using other forms of near field communications. While discussed as a separate element of communication interface 701, RFID interface 710 may be integrated into the elements of communication interface 701. RFID interface 710 is configured to receive a wireless signal from an RFID element so that processing system 703 can determine whether to unlock user interface 702 based on the wireless signal.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes user interface management module 708 and RFID management module 709. Operating software 707 may further include an operating system, utilities, drivers, network interfaces, applications, or some other type of software. When executed by processing circuitry 705, operating software 707 directs processing system 703 to operate wireless communication device 700 as described herein.

In particular, user interface management module 708 directs processing system 703 to lock user interface 702 on wireless communication device 700. RFID management module 709 directs processing system 703 to wirelessly receive a wireless signal from a first RFID element via RFID interface 710 and responsively determine if the wireless signal comprises a valid unlock instruction. If the first signal comprises the valid unlock instruction, then user interface module 709 directs processing system 703 to select one of the operating modes for wireless communication device 700, unlock the user interface on wireless communication device 700, and operate wireless communication device 700 in the selected operating mode.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device having multiple operating modes, the method comprising:
   locking a user interface on the wireless communication device;
   receiving a wireless signal transmitted by a Radio Frequency Identification (RFID) element of multiple RFID elements;
   determining if the wireless signal includes a valid unlock instruction comprising an application programming interface (API) call for unlocking the user interface on the wireless communication device;
   when the wireless signal comprises the valid unlock instruction, selecting an operating mode for unlocking the user interface based on information in the wireless signal, wherein the operating mode selected includes customized operating parameters for the wireless communication device;
   prompting the user to input an additional security measure prior to unlocking the user interface on the wireless communication device;
   receiving the additional security measure from the user and determining if the user is authorized to unlock the user interface based on the additional security measure;
   when the user is authorized to unlock the user interface based on the additional security measure, processing the API call to direct an operating system of the wireless communication device to unlock the user interface on the wireless communication device for operation in the operating mode selected by enabling the customized operating parameters for the wireless communication device; and
   when the user is not authorized to unlock the user interface based on the additional security measure, preventing the user interface on the wireless communication device from unlocking.

2. The method of claim 1, wherein locking the user interface on the wireless communication device comprises:
   determining if the wireless signal comprises a valid lock instruction for locking the user interface of the wireless communication device;
   when the wireless signal comprises the valid lock instruction, locking the user interface on the wireless communication device before unlocking the wireless communication device in the operating mode selected.

3. The method of claim 1, wherein prompting the user to input the additional security measure prior to unlocking the user interface on the wireless communication device comprises determining that a threshold amount of user interface unlock attempts using the RFID element is reached, and responsively prompting the user to input the additional security measure prior to unlocking the user interface on the wireless communication device.

4. The method of claim 1, wherein locking the user interface on the wireless communication device comprises:
   receiving another wireless signal transmitted by another RFID element of the multiple RFID elements and responsively determining if the another wireless signal comprises a valid lock instruction; and
   when the another wireless signal comprises the valid lock instruction, locking the user interface on the wireless communication device.

5. The method of claim 1, wherein selecting the operating mode for unlocking the user interface comprises processing the wireless signal and using the information in the wireless signal as a key to an operating mode data structure in the wireless communication device to select the operating mode from the multiple operating modes of the wireless communication device.

6. The method of claim 1, wherein the operating mode selected inhibits data messaging.

7. The method of claim 1, wherein the operating mode selected indicates a set of software applications installed on the wireless communication device that are allowed to execute.

8. The method of claim 1, wherein the operating mode selected indicates a set of software applications installed on the wireless communication device that are not allowed to execute.

9. The method of claim 1, wherein the multiple RFID elements are geographically dispersed in various environments.

10. The method of claim 1, wherein the RFID element is integrated into a vehicle.

11. A wireless communication device having multiple operating modes, the wireless communication device comprising:
- a user interface configured to be locked and unlocked;
- a Radio Frequency Identification (RFID) interface configured to receive a wireless signal transmitted by an RFID element of multiple RFID elements;
- a processing system configured to determine if the wireless signal includes a valid unlock instruction comprising an application programming interface (API) call for unlocking the user interface on the wireless communication device;
- when the wireless signal comprises the valid unlock instruction,
    - select an operating mode for unlocking the user interface based on information in the wireless signal, wherein the operating mode selected includes customized operating parameters for the wireless communication device,
    - prompt the user to input an additional security measure prior to unlocking the user interface on the wireless communication device;
    - receive the additional security measure from the user and determine if the user is authorized to unlock the user interface based on the additional security measure;
    - when the user is authorized to unlock the user interface based on the additional security measure, process the API call to direct an operating system of the wireless communication device to unlock the user interface on the wireless communication device for operation in the selected operating mode by enabling the customized operating parameters for the wireless communication device, and
    - when the user is not authorized to unlock the user interface based on the additional security measure, preventing the user interface on the wireless communication device from unlocking.

12. The wireless communication device of claim 11, further comprising:
- the processing system configured to determine if the wireless signal comprises a valid lock instruction for locking the user interface of the wireless communication device and, when the wireless signal comprises the valid lock instruction, lock the user interface before unlocking the wireless communication device in the operating mode selected.

13. The wireless communication device of claim 11, wherein the processing system configured to prompt the user to input the additional security measure prior to unlocking the user interface comprises the processing system configured to determine that a threshold amount of user interface unlock attempts using the RFID element is reached, and responsively prompt the user to input the additional security measure prior to unlocking the user interface on the wireless communication device.

14. The wireless communication device of claim 11, further comprising:
- the RFID interface configured to receive another wireless signal transmitted by another RFID element of the multiple RFID elements;
- the processing system configured to determine if the another wireless signal comprises a valid lock instruction in response to receiving the another wireless signal and, when the another wireless signal comprises the valid lock instruction, lock the user interface on the wireless communication device.

15. The wireless communication device of claim 11, wherein the processing system is configured to select the operating mode for unlocking the user interface by processing the wireless signal and using the information in the wireless signal as a key to an operating mode data structure in the wireless communication device to select the operating mode from the multiple operating modes.

16. The wireless communication device of claim 11, wherein the operating mode selected inhibits data messaging.

17. The wireless communication device of claim 11, wherein the operating mode selected indicates a set of software applications installed on the wireless communication device that are allowed to execute.

18. The wireless communication device of claim 11, wherein the operating mode selected indicates a set of software applications installed on the wireless communication device that are not allowed to execute.

19. The wireless communication device of claim 11, wherein the RFID element is transported by the user.

20. The wireless communication device of claim 11, wherein the RFID element is integrated into a vehicle.

* * * * *